3,107,223
VANADIUM PENTOXIDE CATALYST AND
METHOD OF PREPARATION THEREOF
Leslie W. Royer, Beaver, and Robert H. Wainwright, Beaver Falls, Pa., assignors to Koppers Pittsburgh Company, a corporation of Delaware
Filed May 6, 1959, Ser. No. 811,358
5 Claims. (Cl. 252—428)

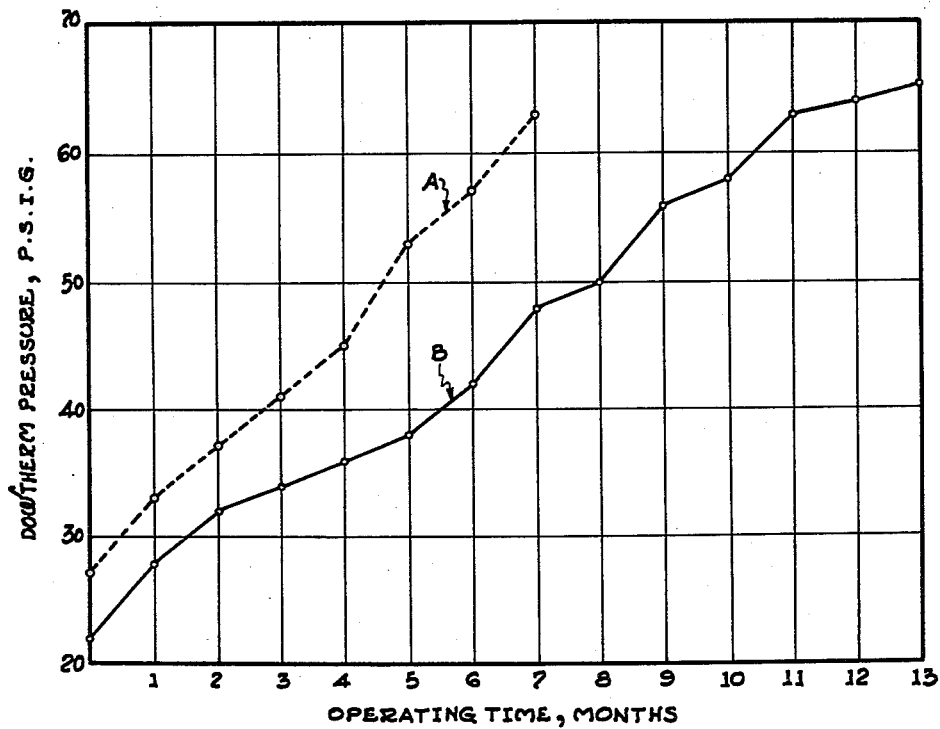

This invention relates to a catalytic oxidation process and to a novel catalyst for use therein. In one specific aspect, it relates to a new low temperature method for oxidation of naphthalene to phthalic anhydride. In another aspect, it relates to a novel vanadium pentoxide catalyst and to the method of its preparation.

Low temperature oxidation of naphthalene to phthalic anhydride has been practiced both in the United States and in Germany for many years. In the conventional low temperature process, naphthalene is passed in the vapor phase over a fixed bed of a silica gel-based vanadium pentoxide catalyst at a temperature of about 300–450° C. and is thereby oxidized to phthalic anhydride. Although the low temperature oxidation of naphthalene has enjoyed considerable commercial success, the process, as conventionally practiced, suffers from certain disadvantages, which are occasioned primarily by the catalyst used therein.

The standard low temperature catalyst is prepared by impregnating silica gel with a vanadium compound, pilling or extruding the impregnated material and activating the catalytic mass by calcination. It is conventional to aid pilling or extruding operations by using from about ½ to 2 percent by weight of an organic binder or lubricant. A typical catalyst comprises, on a volatile-free basis, about 10 percent $V_2O_5$, 65.5 percent $SiO_2$, 23 percent $K_2SO_4$ and trace amounts of other materials. Unfortunately, the use of the standard catalyst in low temperature naphthalene oxidation imposes at least two objectionable limitations on process operation: (1) the operating capacity of the process is limited to about 0.07 lb. of feed per hour per pound of catalyst, and (2) continuous plant operation must be terminated every 5–9 months to replace the spent catalyst. In the past, attempts to operate the low temperature naphthalene oxidation process at increased throughput (without further modification) using a standard catalyst, have failed because such operation was found to be deleterious to catalyst life and to the yield and quality of product. The requirement for a frequent change of catalyst also poses a serious economic problem. For a phthalic anhydride plant having a capacity of about 12 million pounds per year, each change of catalyst costs about $100,000.

Quite surprisingly, we have discovered a novel catalyst, the use of which has eliminated these difficulties attendant the low temperature oxidation of naphthalene. Using our new catalyst we have provided a new low temperature oxidation process which can be operated at a capacity of as high as 0.1 lb. of feed per hour per pound of catalyst and which provides increased yields of phthalic anhydride. At the present price of phthalic anhydride, each 1 percent increase in yield attained without additional operating expense represents a substantial profit. Moreover, the new catalyst remains active for 12–16 months, a period of time which represents about a 100 percent increase in average catalyst operating life.

It is, therefore, an object of the invention to provide a thermally stable naphthalene oxidation catalyst having a considerably longer operating life. It is a further object to provide a new low temperature naphthalene oxidation process which can be operated at higher capacity and which is capable of producing higher yields of phthalic anhydride from a given amount of naphthalene feed.

In accordance with the invention, a catalyst is prepared by uniformly depositing a vanadium compound on powdered silica gel, uniformly admixing therewith about 5–25 percent by weight of polyvinyl alcohol, compressing the admixture and heating the compressed mass at an elevated temperature to volatilize said polyvinyl alcohol. The compressed mass prior to the heating or calcining step thus comprises silica gel uniformly impregnated with a vanadium compound in an amount equivalent to about 5–25 percent by weight of $V_2O_5$ based upon the weight of said silica gel and about 5–25 percent by weight of polyvinyl alcohol based upon the weight of the total composition.

The silica gel useful in the invention is that conventionally used as a carrier for the prior low temperature oxidation catalysts. It is commercially available and is prepared by the reaction of a mineral acid and an alkali metal silicate, usually potassium silicate. In the preparation of the novel catalyst, the silica gel is used in a finely divided form. While the particle size is not particularly critical, we prefer to use a powdered gel having an average mesh size of about 30–100 mesh (U.S. sieves).

Deposition of the vanadium compound on the powdered silica gel base is accomplished by spray impregnation, dipping or other similar means. The choice of vanadium compound used is limited only in that it must be one which can be readily converted to vanadium pentoxide by heating or by known chemical treatments. One particularly effective method of uniformly distributing vanadium pentoxide on the surface of the silica gel comprises forming a solution of vanadyl sulfate by treating hydrated $V_2O_5$ with sulfur dioxide in the presence of sulfuric acid, impregnating the carrier therewith, and converting the vanadyl sulfate to vanadium pentoxide by a subsequent calcination step. An alternative method involves dissolving ammonium meta-vanadate in water, slurrying the carrier in the solution and precipitating hydrated $V_2O_5$ on the surface of the carrier by adding nitric acid. A somewhat less involved method comprises simply impregnating the carrier with ammonium meta-vanadate, followed by a subsequent calcination step to form the vanadium pentoxide in situ on the surface of the carrier. Other suitable decomposable vanadium compounds which may be used as an impregnator include vanadium chloride, vanadyl citrate, vanadyl oxalate, and the like.

The amount of vanadium compound deposited on the carrier is that sufficient to provide a finished catalyst having from about 5–25 percent (volatile-free basis) of vanadium pentoxide uniformly distributed on the carrier surface.

The impregnated carrier is thereafter dried at a low temperature, usually between about 110–150° C. The dry, impregnated carrier is thereafter uniformly blended with about 5–25 percent by weight of polyvinyl alcohol, based upon the weight of the total composition. While it is recognized that it has been suggested to use polyvinyl alcohol in small amounts (i.e. 1–2 percent) as a pilling aid in the preparation of certain other catalysts, we have found that it is necessary, in order to obtain the astonishing results upon which this invention is predicated, to incorporate at least about 5 percent by weight of polyvinyl alcohol within the catalytic mass. Below about 5 percent the vastly improved catalyst life is not obtained and it is not possible to operate the naphthalene oxidation process at the remarkably high capacities made possible by the present invention. If more than about 25 percent polyvinyl alcohol is incorporated within the catalytic mass, the mechanical stability of the mass is adversely affected. The incorporation of polyvinyl alcohol within the limits specified hereinabove provides, after calcination, a highly porous catalytic body having remarkable thermal and mechanical stability.

The catalytic mass having the polyvinyl alcohol blended therewith is then compressed and shaped by pilling or extruding. It is helpful, although not essential, to facilitate shaping by the addition of from about 1–2 per cent of a conventional pilling aid or lubricant, such as stearic acid, and the like. In the shaping operation the admixed mass is compressed on a pilling machine or extruder into a shaped particle having a crushing strength of between about 2 and 25 lbs., preferably between about 4 and 6 lbs. Crushing strength of the pilled or extruded particle is conveniently measured by a commercially-available apparatus known as a "Chatillon Tester." The pellets or shaped particles are conveniently sized to a 1/16–3/16 inch particle diameter for use in the naphthalene oxidation process.

As we have noted hereabove, the presence of polyvinyl alcohol in an amount of about 5–25 percent by weight does not adversely affect the mechanical strength of the catalyst particles. In this respect, polyvinyl alcohol appears to be unique among materials which have been used in small amounts as catalyst pilling aids. For example, we have found that a satisfactory pellet cannot be made using 10 percent stearic acid or 10 percent graphite (coupled with 2 percent stearic acid).

After the shaped particles of the desired size are formed, they are heated or calcined at an elevated temperature to remove the polyvinyl alcohol by oxidation or volatilization and to convert the vanadium compound on the carrier surface to vanadium pentoxide, if necessary. Calcining is effected by gradually heating the pellets or shaped particles in an air stream at a temperture between about 260 and 350° C. Considerable volatile matter escapes from the catalytic mass at temperatures as low as 260–280° C. The temperature is thereafter gradually raised to about 300–350° C. to activate the catalyst for use.

In addition to the vanadium pentoxide and silica, the catalyst mass generally contains up to about 25 percent of an alkali metal sulfate, the presence of which is occasioned by the method of the preparation of the silica gel carrier. Small amounts of other materials such as sodium oxide, iron oxide, aluminum oxide, etc., may be present without adversely affecting either the activity or operating life of the catalyst. Such materials are inherently present as a result of the particular method which is used to prepare the silica gel or the particular vanadium compound which is used as an impregnator.

The novel low temperature napthalene oxidation process of the invention comprises passing vaporized naphthalene over the vanadium pentoxide catalyst prepared as hereinbefore described, at a rate of up to about 0.1 lb. of naphthalene per hour per pound of catalyst at a temperature of about 320–400° C. At least about 85–90 percent of the naphthalene is thereby converted to phthalic anhydride.

Naphthalene for use in the invention is continuously vaporized by introducing it into a vaporization zone at a uniform rate and heating to a temperature sufficient to cause vaporization. The naphthalene is admixed in the vaporization zone with a controlled flow of air to provide a naphthalene feed stream having an air to naphthalene weight ratio of between about 25:1 and 35:1. In practice, it has been found necessary to use to least about 25 lbs. air per pound of naphthalene in order to regenerate the vanadium pentoxide on the surface of the catalyst which is reduced upon contact with naphthalene and to prevent deposition of carbonaceous materials on the catalyst surface which are detrimental to catalyst activity. No advantage is seen in using an air to naphthalene weight ratio of greater than about 35:1 because of the cost involved in pumping the air through the system.

Using the novel method of the invention, it is possible to operate at a feed rate of up to about 0.1 lb. of naphthalene per hour per pound of catalyst (volatile-free basis). As we have already noted, former low temperature oxidation processes were limited in that using such processes it was not possible to operate at a capacity higher than about 0.07 lb. of naphthalene per hour per pound of catalyst (volatile-free basis), because of the detrimental effect on catalyst life and the reduced yields resulting from the under oxidation of the naphthalene. It is conventional in low temperature oxidation to accomplish the conversion of naphthalene to phthalic anhydride in a single pass of the feed stock. Recycling of unreacted naphthalene is not considered practical, because of the build-up of impurities in the system which tend to poison the catalyst and because of the explosion hazards involved in handling a mixture of unreacted and under oxidized naphthalene. The method of the invention converts naphthalene to phthalic anhydride in a single pass with yields of greater than about 85–90 per cent of theory. The high production capacity made possible by the present invention is astonishing in view of prior art experience.

The vaporized air and naphthalene feed stream is then passed into a conversion zone containing a fixed bed of the novel catalyst of the invention. Conveniently, the conversion zone is a shell and tube-type converter with the catalyst particles being located inside the tubes. The feed vapor passes downward through the catalyst bed and oxidation of the naphthalene to phthalic anhydride takes place.

The reaction temperature is maintained between about 320 and 400° C. The use of a temperature below about 320° C. results in reduced yields occasioned by the failure to obtain complete reaction of the naphthalene. At a temperature above about 400° C. with an active catalyst there tends to be some over oxidation of napthalene to form maleic anhydride. The reaction temperature is conveniently controlled by a bath of liquid Dowtherm (a eutectic mixture of phenyl ether and biphenyl) in the shell side of the converter. The heat generated during the reaction is absorbed by the liquid Dowtherm, which is held at its boiling point. Dowtherm vapors are cooled in an outside condensing system and liquid Dowtherm is returned to the converter shell to complete the heat removal cycle. The boiling point of the Dowtherm is regulated by maintaining a positive gas pressure on the liquid.

It is desirable to use the lowest possible temperature within the specified range during the oxidation process. When the catalyst is new and active, the catalyst bed temperature is maintained at about 330–350° C. The Dowtherm temperature, i.e. the boiling point of the Dowtherm, is about 20–30° lower than the catalyst bed temperature. As the catalyst begins to age, it is necessary, in order to get complete reaction, to increase the Dowtherm temperature (thereby increasing the catalyst bed temperature) by increasing the positive pressure applied to the liquid Dowtherm. Thus, the rate of the necessary change in pressure applied to the liquid Dowtherm is an indication of expected catalyst life. If catalyst activity is steady, the gas pressure on the Dowtherm can be maintained at a constant level, but if the catalyst loses activity readily the gas pressure will have to be raised at an increasingly rapid rate. When the gas pressure reaches about 80 lbs. per square inch gage, the Dowtherm temperature is approximately 370° C. (catalyst bed temperature about 400° C.). At this point the catalyst is normally spent.

The feed vapor is conveniently forced through the system using a slight positive inlet pressure, for example about 9–12 p.s.i.g. The contact time between the catalyst and the feed generally ranges between about 0.5 and 1.2 seconds. As the catalyst decreases in activity it may be desirable to increase the contact time as well as the temperature. This is conveniently accomplished by increasing the outlet pressure of the system from about 4–6 p.s.i.g. up to about 9–10 p.s.i.g.

The hot gases from the conversion zone are condensed to produce crystalline phthalic anhydride. One convenient commercial method involves passing the vapors into box condensers containing a series of tubes which are alternately cooled and heated by oil circulating within the tubes. The crude phthalic anhydride thus obtained is melted, distilled and flaked to give commercial grade phthalic anhydride having the desired specifications.

The astonishing catalyst life resulting from the use of the novel catalyst of the invention in the low temperature oxidation of naphthalene is graphically illustrated in the drawing.

In the drawing, the Dowtherm pressure in p.s.i.g. (the means by which the reaction temperature is conveniently controlled as explained hereabove) is plotted against operating time in months. Curve A represents the performance of a conventional prior art low temperature oxidation catalyst having the following chemical composition on a volatile-free basis: $V_2O_5$—10 percent; $SiO_2$—65.5 percent; $K_2SO_4$—23 percent; $Na_2O$—0.5 percent; $Fe_2O_3$ and $Al_2O_3$—1 percent. Curve B represents the performance of the novel catalyst of the invention which, although it has an identical chemical composition, has in addition the increased porosity and thermal stability provided by incorporating into the catalyst mass 5 percent by weight of polyvinyl alcohol and subsequently removing the polyvinyl alcohol by calcination. The runs shown were made, using substantially identical feed rates and other operating conditions, in a commercial size converter having over 2,000 individual catalyst tubes. Both runs were terminated when the yield and purity of the product began to fall off. As we have already noted, the Dowtherm pressure is increased in order to provide the necessary increase in temperature as the catalyst activity decreases. The catalyst is normally spent when the Dowtherm pressure is about 65–80 lbs. per square inch gage. It is clearly shown by the drawing that the required rate of increase in Dowtherm pressure, i.e. reaction temperature, is much slower with the novel catalyst of the invention. The novel catalyst had an operating life of 13 months in contrast with the seven months operating life of the conventional catalyst. The data upon which the drawing is based is shown hereunder.

TABLE I

| Operating Time, Months | Dowtherm pressure, p.s.i.g.: | |
|---|---|---|
| | Catalyst A | Catalyst B |
| 0 | 27 | 22 |
| 1 | 33 | 28 |
| 2 | 37 | 32 |
| 3 | 41 | 34 |
| 4 | 45 | 36 |
| 5 | 53 | 38 |
| 6 | 57 | 42 |
| 7 | ¹ 63 | 48 |
| 8 | | 50 |
| 9 | | 56 |
| 10 | | 57 |
| 11 | | 63 |
| 12 | | 64 |
| 13 | | ¹ 65 |

¹ Run terminated because of diminished yield of product.

Our invention is further illustrated by the following examples:

Example I

A 25 lb. batch of silica gel, prepared by reacting potassium silicate with sulfuric acid, was ground through a 30 mesh screen (U.S. sieves). The gel contained about 30 percent volatile matter, which was primarily water. An aqueous solution containing about 7.5 lbs. of vanadyl sulfate was prepared and applied to the gel by spray impregnation in a rotating drum. The amount of vanadyl sulfate impregnated on the carrier was equivalent to about 2 lbs. of vanadium pentoxide. The impregnated gel was tumble dried in a hot air stream. It was thereafter uniformly blended with 0.5 lb. of "Stearotex," a commercially available pilling aid consisting essentially of stearic acid, and 2.3 lbs. of polyvinyl alcohol (equivalent to about 7.5 percent polyvinyl alcohol based upon the total weight of the composition before calcination). The catalytic mass was thereafter shaped on a standard pilling machine into ⅛ x ⅛ inch pellets having a crushing strength of 5–6 lbs. The catalyst thus obtained weighed 33 lbs. and had the following composition: volatile matter (determined at 950° C.)—40 percent; chemical composition (volatile-free basis), $V_2O_5$—10 percent, $K_2SO_4$—23 percent and $SiO_2$—67 percent. The catalyst was then heated gradually to a temperature of 325° C. in an air stream to convert the vanadyl sulfate to vanadium pentoxide and to remove the polyvinyl alcohol.

Example II

A commercial grade naphthalene having a freezing point of 77° C. was continuously passed into a vaporizer, wherein it was heated to a temperature sufficient to cause complete vaporization and blended with air to provide a continuous feed stream having an air to naphthalene weight ratio of 30:1. The naphthalene-air feed stream was passed downward through a fixed bed of 5,500 lbs. (volatile-free basis) of the new catalyst prepared as described in Example I at a rate of 500 lbs. of naphthalene per hour. The average on stream oxidation temperature was 350–370° C. A run under comparable operating conditions was also made using 5,500 lbs. of the standard commercial catalyst. The results are shown in Table II. The data given in Table II represent an average of several readings taken after the unit was placed on stream.

TABLE II

| Catalyst | Percent P.V.A.¹ Blended with Catalyst Mass Before Calcination | Naphthalene Feed Rate, Lbs./Hour | Air/Naphthalene Weight Ratio | Average Operating Temperature, ° C. | Yield of Phthalic Anhydric, Percent of Theory |
|---|---|---|---|---|---|
| New Catalyst | 7.5 | 500 | 30/1 | 350–370 | 86.8 |
| Standard Catalyst | 0 | 379 | 30/1 | 350–370 | 82.7 |

¹ 1.5 percent stearic acid was used as a pilling aid in the preparation of both catalysts.

It should be observed from the table that the process of the invention, using the novel catalyst, provided a 4.1 percent increase in the theoretical yield of phthalic anhydride. The novel process was operated at a feed rate of 500 lbs. per hour, which corresponds to 0.091 lb. of feed per hour per pound of catalyst. In contrast therewith, using the standard catalyst, the feed rate had to be limited to 0.069 lb. of feed per hour per pound of catalyst to prevent a drop in yield and product quality.

Example III

Four catalysts were prepared according to the procedure of Example I, with the following exceptions: (1) the first catalyst had no polyvinyl alcohol blended therewith before calcination, (2) the second catalyst had 5 percent polyvinyl alcohol blended therewith before calcination, (3) the third catalyst had 7.5 percent polyvinyl alcohol blended therewith before calcination, and (4) the fourth catalyst had 10 percent polyvinyl alcohol blended therewith before calcination. Each of the catalysts were tested in a small converter having nine catalyst tubes. Each tube was 1 inch in diameter and 130 inches long and was packed with 100 inches of catalyst. Naphthalene was vaporized and blended with air to provide a feed stream having an air to naphthalene weight ratio of 35:1. The naphthalene feed stream was passed over each of the catalysts for a period of several weeks. The average on stream results are shown below in Table III.

TABLE III

| Catalyst | Percent P.V.A.[1] Blended with Catalyst Before Calcination | Feed Rate, lbs./hr./lb. of Catalyst | Air/Naphthalene Weight Ratio | Average Operating Temperature, °C | Yield of Phthalic Anhydride, percent of Theory |
| --- | --- | --- | --- | --- | --- |
| 1 | 0 | [2] 0.072 | 35/1 | 350 | 83.5 |
| 2 | 5 | 0.082 | 35/1 | 355 | 87.2 |
| 3 | 7.5 | 0.082 | 35/1 | 350 | 89.0 |
| 4 | 10 | 0.072 | 35/1 | 340 | 89.0 |

[1] 1.5 percent stearic acid was used as a pilling aid in the preparation of all catalysts.
[2] Maximum possible feed rate without adversely affecting yield.

The results of the foregoing tests clearly show that our novel catalyst, in addition to having longer operating life (as shown in the drawing) and providing a higher operating capacity (Example II), gives significantly higher yields per pass of phthalic anhydride.

*Example IV*

Three catalysts were prepared according to the procedure of Example I with the following exceptions: (1) the first catalyst had no polyvinyl alcohol incorporated therein, (2) the second catalyst had 17 percent polyvinyl alcohol incorporated therein, and (3) the third catalyst had 30 percent polyvinyl alcohol incorporated therein. All of the catalysts were pelleted to a 6 lb. crushing strength as determined by a "Chatillon Tester." The three catalysts were calcined at 350° C. and the crushing strength of each was thereafter measured to determine mechanical stability. The results are shown hereunder in Table IV.

TABLE IV

| Catalyst | Percent P.V.A. | Crushing Strength, lbs. | | |
| --- | --- | --- | --- | --- |
| | | Before Calcination | After Calcination | Loss |
| 1 | 0.0 | 6 | 4.1 | 1.9 |
| 2 | 17.0 | 6 | 2.8 | 3.2 |
| 3 | 30.0 | 6 | 0.3 | 5.7 |

From a practical standpoint, a loss in crushing strength during calcination of about 4 lbs. is about the maximum which can be tolerated for a pellet having an original crushing strength of 6 lbs. It is observed that the catalyst mass containing 30 percent polyvinyl alcohol prior to calcination showed an excessive loss of crushing strength.

*Example V*

Catalysts were prepared according to the procedure of Example I using various organic materials including stearic acid, wheat flour, graphite, sawdust and polyvinyl alcohol as additives prior to pelleting and calcination. The properties of the various catalysts after calcination at 350° C. are shown hereunder in Table V. The porosity was determined from the pellet density and powder density of the catalyst. The pellet density was obtained by measuring the dimensions of a number of pellets with a micrometer, weighing the pellets and calculating the density as weight per unit volume. The powder density was obtained by grinding some of the pellets to a fine powder passing through a 325 mesh screen and determining the density of the powder by a standard pycnometer procedure. Porosity (percent free space within the pellet) is equal to powder density minus pill density × 100 divided by the powder density.

TABLE V

| Material added to Catalytic Mass prior to Calcination | Bulk Density, g./cc. | Pill Density, g./cc. | Powder Density, g./cc. | Porosity, percent by volume | Porosity Increase, percent |
| --- | --- | --- | --- | --- | --- |
| 2 percent stearic acid | 0.79 | 1.29 | 2.24 | 42.4 | |
| 5 percent P.V.A.+2 percent stearic acid | 0.65 | 1.13 | 2.24 | 49.5 | 16.7 |
| 10 percent P.V.A.+2 percent stearic acid | 0.61 | 1.03 | 2.24 | 54.0 | 27.4 |
| 15 percent P.V.A.+2 percent stearic acid | 0.57 | 0.97 | 2.24 | 56.6 | 33.5 |
| 10 percent sawdust+2 percent stearic acid | ([1]) | ([1]) | ([1]) | ([1]) | ([1]) |
| 10 percent wheat flour+2 percent stearic acid | ([1]) | ([1]) | ([1]) | ([1]) | ([1]) |
| 10 percent graphite+2 percent stearic acid | ([1]) | ([1]) | ([1]) | ([1]) | ([1]) |
| 10 percent stearic acid | ([1]) | ([1]) | ([1]) | ([1]) | ([1]) |

[1] The mass could not be pelleted.

It is seen from the table that, of the materials tested, only the polyvinyl alcohol produced a satisfactory catalyst from a mechanical standpoint when added in substantial quantity. No pills could be produced using 10 percent sawdust, 10 percent wheat flour, 10 percent graphite or 10 percent stearic acid. The data also show the increase in porosity and, therefore, the increase in active surface area of the novel catalyst of the invention.

We claim:

1. Method of making oxidation catalyst comprising uniformly depositing a vanadium compound capable of being readily converted to vanadium pentoxide on powdered silica gel, uniformly admixing therewith about 5–25 percent by weight polyvinyl alcohol, compressing the admixture into shaped particles, and heating said particles at an elevated temperature to remove said polyvinyl alcohol.

2. Method of making oxidation catalyst comprising uniformly depositing a vanadium compound capable of being readily converted to vanadium pentoxide on powdered silica gel in an amount equivalent to 5–25 percent by weight vanadium pentoxide, uniformly admixing therewith about 5–25 percent by weight polyvinyl alcohol, compressing the admixture into shaped particles, and heating said particles at a temperature of about 260–350° C. to remove said polyvinyl alcohol.

3. Method of making oxidation catalyst comprising uniformly depositing vanadyl sulfate on powdered silica gel in an amount equivalent to 5–25 percent by weight vanadium pentoxide, uniformly admixing therewith 5–25 percent by weight polyvinyl alcohol, compressing the admixture into pellets having a crushing strength of 2–25 lbs., and heating said pellets at a temperature of 260–350° C. to convert said vanadyl sulfate to vanadium pentoxide and to remove said polyvinyl alcohol.

4. An oxidation catalyst intermediate comprising silica gel uniformly impregnated with a vanadium compound capable of being readily converted to vanadium pentoxide in an amount equivalent to about 5–25 percent by weight of $V_2O_5$ based on the weight of said silica gel and containing about 5–25 percent by weight of polyvinyl alcohol, based up the weight of the total composition.

5. An oxidation catalyst intermediate comprising silica gel uniformly impregnated with vanadyl sulfate in an amount equivalent to about 5–25 percent by weight of $V_2O_5$ based on the weight of said silica gel and containing 5–25 percent by weight of polyvinyl alcohol based upon the weight of the total composition.

(References on following page)

References Cited in the file of this patent

UNITED STATES PATENTS

| | | |
|---|---|---|
| 2,107,611 | Jarl et al. | Feb. 8, 1938 |
| 2,328,103 | See et al. | Aug. 31, 1943 |
| 2,674,582 | Darby | Apr. 6, 1954 |
| 2,863,879 | Tribit | Dec. 9, 1958 |
| 2,809,939 | Dixon | Oct. 15, 1957 |
| 2,815,352 | Johannsen | Dec. 3, 1957 |
| 2,929,792 | Arnold et al. | Mar. 22, 1960 |
| 2,992,238 | Zimmerman | July 11, 1961 |

OTHER REFERENCES

"Elvanol," pub. by Du Pont Company, Wilmington, Delaware, copyright 1947, page 7.